(12) United States Patent
Lu et al.

(10) Patent No.: US 11,849,123 B2
(45) Date of Patent: Dec. 19, 2023

(54) METHOD AND APPARATUS OF STARTING PICTURE DISPLAY OF DISPLAY DEVICE, AND DISPLAY DEVICE

(71) Applicants: K-Tronics (Suzhou) Technology Co., Ltd., Suzhou (CN); BOE TECHNOLOGY GROUP CO., LTD., Beijing (CN)

(72) Inventors: Zhengyu Lu, Beijing (CN); Zhongzhi Wen, Beijing (CN)

(73) Assignees: K-tronics (Suzhou) Technology Co., Ltd., Suzhou (CN); BOE Technology Group Co., Ltd., Beijing (CN)

( * ) Notice: Subject to any disclaimer, the term of this patent is extended or adjusted under 35 U.S.C. 154(b) by 123 days.

(21) Appl. No.: 17/311,376

(22) PCT Filed: Sep. 29, 2020

(86) PCT No.: PCT/CN2020/118707
§ 371 (c)(1),
(2) Date: Jun. 7, 2021

(87) PCT Pub. No.: WO2022/067468
PCT Pub. Date: Apr. 7, 2022

(65) Prior Publication Data
US 2022/0103836 A1 Mar. 31, 2022

(51) Int. Cl.
*G09G 5/00* (2006.01)
*G09G 5/22* (2006.01)
(Continued)

(52) U.S. Cl.
CPC ............. *H04N 19/172* (2014.11); *G09G 5/10* (2013.01); *G09G 2320/0686* (2013.01)

(58) Field of Classification Search
CPC ........ G06F 13/32; G06F 3/147; G06F 9/4411; G06F 9/445; G09G 5/10; G09G 2320/0686; G09G 2320/0646; G09G 2320/0233; G09G 2320/0693; G09G 2320/0242; G09G 2360/16; G09G 2320/0673; G09G 2320/0626; G09G 2310/027;
(Continued)

(56) References Cited

U.S. PATENT DOCUMENTS 9,811,190 B2 * 11/2017 Ma ...................... G06F 3/04184
9,983,061 B2 * 5/2018 Zhang ..................... G09G 3/006
(Continued)

FOREIGN PATENT DOCUMENTS

| CN | 101646029 A | | 2/2010 | |
| CN | 107861896 A | * | 9/2016 | ............. G06F 13/32 |
| CN | 106847228 A | | 6/2017 | |
| CN | 107748687 A | | 3/2018 | |
| CN | 107861896 A | | 3/2018 | |

*Primary Examiner* — Wesner Sajous
(74) *Attorney, Agent, or Firm* — Westman, Champlin & Koehler, P.A.

(57) ABSTRACT

Embodiments of the present disclosure provide a method and apparatus of starting a picture display of a display device, and a display device. The display device includes a display panel. The method includes: receiving a first video data for an image display, in response to receiving a start signal; setting display parameters of the display panel by using a control data in the first video data; and transmitting a second video data to the display panel for a LOGO display.

10 Claims, 5 Drawing Sheets

(51) Int. Cl.
*G09G 3/36* (2006.01)
*G09G 5/36* (2006.01)
*H04N 19/17* (2014.01)
*H04N 21/44* (2011.01)
*H04N 19/172* (2014.01)
*G09G 5/10* (2006.01)

(58) Field of Classification Search
CPC ...... G09G 6/3607; G09G 5/3607; G09G 3/20; G09G 2370/04; G09G 2320/08; G09G 2370/08; H04N 21/4436; H04N 9/64; H04N 9/73; H04N 9/69; H04N 9/70; H04N 9/71; H04N 9/77
See application file for complete search history.

(56) References Cited

U.S. PATENT DOCUMENTS

| | | | |
|---|---|---|---|
| 10,432,814 B2 | 10/2019 | Ito | |
| 10,948,750 B2* | 3/2021 | Wang | G02F 1/1323 |
| 11,094,281 B2* | 8/2021 | Wang | G06F 3/1423 |
| 11,231,938 B2* | 1/2022 | Duan | G06F 3/147 |
| 2015/0296166 A1* | 10/2015 | Lin | H04N 21/41265 |
| | | | 348/714 |
| 2019/0073972 A1 | 3/2019 | Gao et al. | |

* cited by examiner

METHOD AND APPARATUS OF STARTING PICTURE DISPLAY OF DISPLAY DEVICE, AND DISPLAY DEVICE

CROSS-REFERENCE TO RELATED APPLICATION

This application is a 371 National Stage Application of International Application No. PCT/CN2020/118707, filed on Sep. 29, 2020, entitled "METHOD AND APPARATUS OF STARTING PICTURE DISPLAY OF DISPLAY DEVICE, AND DISPLAY DEVICE", the contents of which are incorporated by reference in their entireties.

TECHNICAL FIELD

The present disclosure relates to a field of display technology, and in particular to a method and apparatus of starting a picture display of a display device, and a display device.

BACKGROUND

After a display device is powered on and before a normal image or program picture is displayed, a LOGO, such as the manufacturer's LOGO, may be displayed on a screen. Between the LOGO picture and the normal picture, there may be a black screen phase of more than 1 second, which extends a time from a start of the display device to a normal picture display, and causes a bad user experience. Once the screen of the display device is illuminated, a user may consider that the display device has been initialized and has met the conditions for a normal operation. Therefore, if a black screen appears after an end of the LOGO picture, the user may think that the display device is abnormal.

SUMMARY

According to a first aspect of the embodiments of the present disclosure, there is provided a method of starting a picture display of a display device including a display panel. The method includes: receiving a first video data for an image display, in response to receiving a start signal; setting display parameters of the display panel by using a control data in the first video data; and transmitting a second video data to the display panel for a LOGO display.

In some embodiments, the display device further includes a backlight source; and the method further includes: transmitting a backlight signal to the backlight source so as to control the backlight source to illuminate the display panel, after setting the display parameters of the display panel by using the control data in the first video data, and prior to transmitting the second video data to the display panel for the LOGO display.

In some embodiments, the method further includes: subsequent to setting the display parameters of the display panel by using the control data in the first video data, transmitting an image data in the first video data to the display panel for display.

In some embodiments, the image data in the first video data is transmitted to the display panel via a first channel; and the second video data is transmitted to the display panel via a second channel.

In some embodiments, the display panel only receives the second video data transmitted via the second channel, in a case where data are transmitted simultaneously via the first channel and the second channel.

In some embodiments, a specified number of bits of the image data in the first video data is masked by using the second video data, in a case where data are transmitted simultaneously via the first channel and the second channel.

In some embodiments, data following the specified number of bits of the image data is buffered, in a case where the specified number of bits of the image data in the first video data is masked by using the second video data and the LOGO display is not completed.

In some embodiments, the method further includes: setting a duration of the LOGO display in response to receiving the start signal.

According to a second aspect of the embodiments of the present disclosure, there is provided a video signal processing apparatus for starting a picture display of a display device including a display panel. The video signal processing apparatus includes: a memory having computer-readable instructions stored thereon; and at least one processor configured to execute the computer-readable instructions, so as to implement the method according to the embodiments of the present disclosure.

According to a third aspect of the embodiments of the present disclosure, there is provided a video signal processing apparatus for starting a picture display of a display device including a display panel. The video signal processing apparatus includes: an image search module configured to receive a first video data and transmit the first video data to an image processing module; a LOGO display module configured to store a second video data for a LOGO display, and to transmit the second video data to the image processing module after display parameters of the display panel are set by the image processing module; the image processing module configured to receive the first video data from the image search module, extract a control data from the first video data, transmit the control data to a signal control and output module, receive the second video data from the LOGO display module, and transmit the second video data to the signal control and output module; and the signal control and output module configured to receive the control data and the second video data from the image processing module, and transmit the control data and the second video data sequentially to the display panel for display.

According to a fourth aspect of the embodiments of the present disclosure, there is provided a display device, including: a display panel; and a display driver board, wherein the video signal processing apparatus according to the embodiments of the present disclosure is provided on the display driver board.

In some embodiments, the display device further includes a data masker provided between the display driver board and the display panel, and the data masker is configured to mask a first video data transmitted via a first channel in a case where data are transmitted simultaneously via the first channel and a second channel.

In some embodiments, the display device further includes a backlight source.

BRIEF DESCRIPTION OF THE DRAWINGS

The above and other features of the present disclosure will become more apparent through the following detailed description in conjunction with the drawings.

In the drawings, the same or similar structures are denoted by the same or similar reference numerals.

DETAILED DESCRIPTION OF EMBODIMENTS

In order to make the objectives, technical solutions and advantages of the present disclosure clearer, the present disclosure will be further described in detail below in connection with the drawings. It should be noted that the following description is for illustration only and not intended to limit the present disclosure. In the following description, a number of specific details are set forth in order to provide a thorough understanding of the present disclosure. However, it will be apparent to those ordinary skilled in the art that these specific details are not necessary to implement the present disclosure. In other examples, in order to avoid confusion with the present disclosure, well-known circuits, materials, or methods are not specifically described.

Throughout the specification, references to "one embodiment," "an embodiment," "one example," or "an example" mean that a specific feature, structure, or characteristic described in conjunction with the embodiment or example is included in at least one embodiment of the present disclosure. Therefore, the phrases "in one embodiment", "in an embodiment", "one example" or "an example" appearing in various places throughout the specification do not necessarily refer to the same embodiment or example. Further, specific features, structures or characteristics may be combined in one or more embodiments or examples in any suitable combination and/or sub-combination. In addition, those ordinary skilled in the art should understand that the drawings provided herein are for the illustrative purpose, and the drawings are not necessarily drawn to scale. The term "and/or" as used here includes any and all combinations of one or more related listed items.

Figure 1:
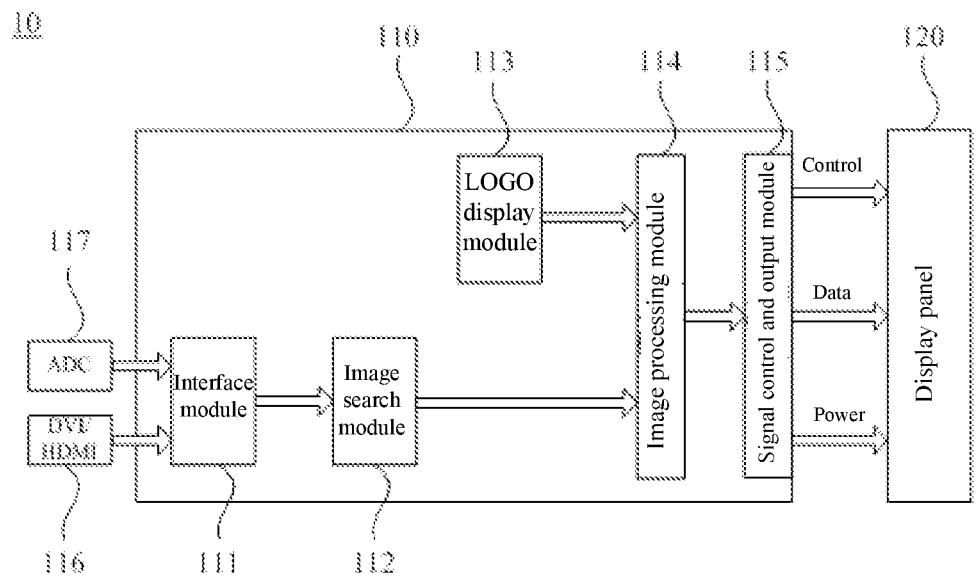
FIG. 1 shows a schematic principle diagram of a display device according to some embodiments of the present disclosure.

FIG. 1 shows a schematic principle diagram of a display device according to some embodiments of the present disclosure. As shown in FIG. 1, a display device 10 includes a display driver board 110 and a display panel 120. The display driver board 110 is used to receive a video signal from the outside of the display device 10 and process the video signal, including parsing a display picture and adjusting a resolution of the display picture. Then, the video signal processed is transmitted to the display panel 120 for display. A display array including pixel units is provided on the display panel 120. The display panel 120 receives the video signal from the display driver board 110 and drives the display array to display images or videos according to the video signal received.

For ease of description, according to functions achieved, it may be considered that the display driver board 110 includes an interface module 111, an image search module 112, a LOGO display module 113, an image processing module 114 and a signal control and output module 115. Those skilled in the art may understand that the corresponding functions may be achieved by integrated circuit chips such as a processor provided on the display driver board 110.

When the display device 10 is powered on, an initialization process is first performed. In the initialization process, an initial operation state of each module on the display driver board 110 and an initial operation state of the display array on the display panel 120 may be set. Then, the interface module 111 detects a signal input from the outside so as to determine whether a video data (a first video data) for an image display is input. At the same time, a pre-stored video data (a second video data) for a LOGO display is transmitted to the image processing module 114 through the LOGO display module 113, so that the LOGO is displayed on the display panel 120 according to the second video data.

As shown in FIG. 1, interfaces of the display device 10 are shown as an analog signal interface 117 and a digital signal interface 116. The analog signal interface 117 is used to input an analog video signal, and an analog-to-digital converter (ADC) is integrated in the analog signal interface 117 to convert the analog video signal input into a digital video signal. The digital signal interface 116 is used to directly input a digital video signal, and the signal may be in a DVI (Digital Visual Interface) format or an HDMI (High Definition Multimedia Interface) format. An external device or an external signal source used to input the video signal to the display device 10 may include an external host device or an external signal generator, which is not limited in the embodiments of the present disclosure, as long as it is an external device or an external source that may generate and transmit the signal for displaying images or videos. The interface module 111 continuously detects the interfaces of the display device 10. The image search module 112 receives the video signal from the interfaces when the interface module 111 detects that the signal is transmitted to the analog signal interface 117 or the digital signal interface 116. Then, the image search module 112 transmits the video signal received to the image processing module 114. The video signal is processed by the image processing module 114 and then transmitted to the signal control and output module 115 for output and display.

The video signal may contain a video data, and the video data further contains a control data and an image data. The control data may be used to set display parameters of the display panel for the picture display, and the image data may be used to display images or videos. By way of example, a low voltage differential signaling (LVDS) used in a liquid crystal display transmitted to the digital signal interface 116 may contain a RGB data signal, a clock signal and a control signal. The RGB data signal contains a specific image data to be displayed. The clock signal is a pixel clock signal, which may also be referred to as a data shift clock, and is used to convert input parallel RGB data into serial data. The pixel clock signal is a reference for transmitting data and reading the data signal. The control signal may contain a control data such as a data strobe signal DE, a horizontal synchronization signal HS, a vertical synchronization signal VS, a standby control signal, and a data sampling point selection signal. The control signal is used to set various parameters for the picture display. For example, a timing, a brightness contrast and a display quality are set to display the picture normally. The data signal, the clock signal and the control signal described above are only examples, and do not constitute a limitation to the embodiments of the present disclosure.

The image processing module 114 extracts the data signal, the clock signal and the control signal from the video signal respectively according to a type of the signal received. Then, the display parameters of the display panel are set according to the control signal extracted. For example, the control signal (that is, the control data) is transmitted to the signal control and output module 115 at a specified timing, and then transmitted by the signal control and output module 115 to a corresponding control signal input terminal on the display panel 120. After the display parameters are set, the signal control and output module 115 continuously transmits the RGB data signal (that is, the image data) received to the corresponding data signal input terminal of the display panel 120, so that the display panel 120 displays the picture according to the image data, thereby completing a process from the power-on to the picture display.

In the above startup process, a possible problem is a conflict between the LOGO display and the parameter settings of the display panel. As mentioned above, after the display device 10 is powered on, the LOGO display module 113 transmits the second video data for the LOGO display to the image processing module 114. That is, it is likely that the LOGO display has not ended yet when the image processing module 114 transmits the control data to the signal control and output module 115. In this case, the signal control and output module 115 may not immediately transmit the control data to the corresponding control signal input terminal on the display panel 120, but needs to suspend the setting of the display panel 120, that is, suspend the transmission of the control data to the display panel 120. The screen of the display panel 120 should be illuminated when the LOGO is being displayed, that is, the backlight source of the display panel 120 should be illuminated. If the screen is not illuminated, the picture may not be displayed. When the screen is illuminated, if the control signal such as the data strobe signal DE, the horizontal synchronization signal HS or the vertical synchronization signal VS is transmitted to the display panel 120, an aging picture may be displayed on the screen. The aging picture is a picture displayed by the display panel 120 by default in case of no valid picture data, and a content displayed in the aging picture may be different according to different settings of the display panel 120. Generally, a first picture of the aging picture is a white picture, so this phenomenon of displaying the first picture of the aging picture is generally called a flashing white screen. If the display parameters are set when the screen is illuminated, the flashing white screen may appear because the data strobe signal DE, the horizontal synchronization signal HS and the vertical synchronization signal VS need to be retransmitted to the display panel 120. In order to avoid the flashing white screen, the transmission of the control data to the display panel 120 may be suspended when the LOGO display is not completed. The backlight source is turned off after the LOGO display ends, that is, the control data is transmitted to the display panel 120 after the screen is turned off, which may cause an extension of the process from the power-on to the normal picture display.

Figure 2:
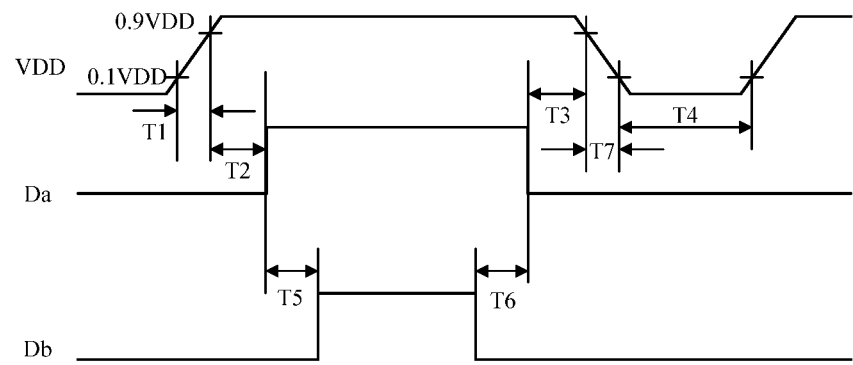
FIG. 2 schematically shows a driving signal timing diagram of a display panel according to some embodiments of the present disclosure.

FIG. 2 schematically shows a driving signal timing diagram of a display panel according to some embodiments of the present disclosure. As shown in FIG. 2, a signal waveform VDD represents a waveform of a power supply signal, a signal waveform Da represents a waveform of a data signal, and a signal waveform Db represents a waveform of a backlight signal. The backlight signal is used to drive the backlight source to illuminate the display panel. For a normal display, the display panel 120 should satisfy the following conditions. The power supply signal VDD is applied to the display panel 120. In a case where the power supply signal VDD is maintained as a valid signal, the data signal Da is applied to the display panel 120. In a case where the data signal Da is maintained as a valid signal, the backlight signal Db is applied to the display panel 120. The process of turning off the screen and the display picture is the reverse of the process described above. As shown in FIG. 2, in an example, an order of T1~T3, T5, T6 and T7 may be several tens of milliseconds. For example, T1 may be in a range of 0.5~10 ms, T2 and T3 may be in a range of 0~50 ms, and T5 may be greater than 500 ms. As shown in FIG. 2, T4 shows a time interval that should be satisfied between two lightings of the screen of the display panel 120. After the screen of the display panel 120 is turned off, a part of display chips may be reset to an initial state so as to ensure a correct display when the screen is illuminated again. In order to ensure the resetting of this part of display chips, T4 should be greater than or equal to 1 s. That is, if the screen is turned off after the LOGO display ends, the screen may be illuminated again after more than 1 s. However, the time for setting the display parameters of the display panel 120 is actually very short, much less than 1 second. Therefore, after the display parameters are set, it is often necessary to wait for a relatively long time before entering the normal picture display process. The user may clearly feel the turn-off of the screen after the LOGO display ends, which results in a bad user experience.

Figure 3:
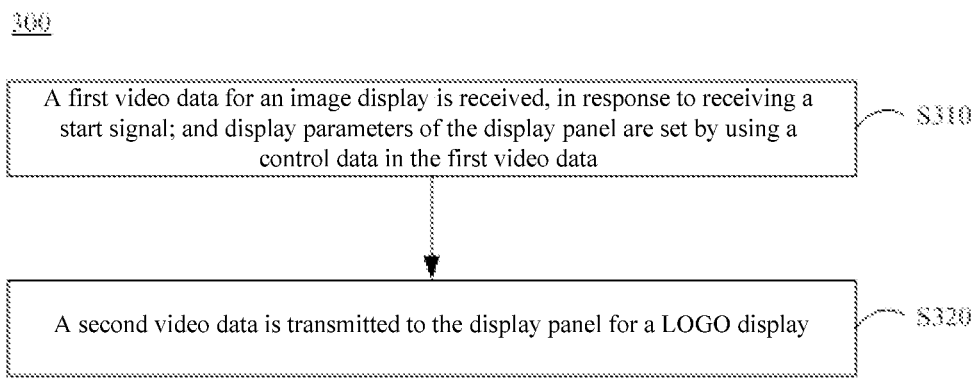
FIG. 3 schematically shows a flowchart of a method of starting a picture display of a display device according to some embodiments of the present disclosure.

According to the embodiments of the present disclosure, there is provided a method of starting a display device, which may avoid the flashing white screen and shorten the time from the power-on to the normal picture display. FIG. 3 schematically shows a flowchart of a method 300 of starting a picture display of a display device according to some embodiments of the present disclosure. The method 300 includes following steps.

In step S310, a first video data for an image display is received, in response to receiving a start signal; and display parameters of the display panel are set by using a control data in the first video data.

In step S320, a second video data is transmitted to the display panel for a LOGO display.

The description will be given below with reference to the schematic principle diagram of the display device in FIG. 1.

In step S310, the LOGO display module 113 is controlled to temporarily not transmit the second video data for the LOGO display to the image processing module 114 (that is, temporarily not perform the process of displaying the LOGO picture), after the display device 10 receives the start signal (that is, after the display device 10 is powered on). In addition, the process of detecting, receiving, processing and setting the first video data for the image display is normally performed. In other words, after the display device 10 receives the start signal (that is, after the display device 10 is powered on), the interface module 111 detects the signal input from the outside so as to determine whether the video data for the image display (that is, the first video data) is input. When it is detected that the signal is transmitted to the analog signal interface 117 or the digital signal interface 116, the video signal is received from the interface through the image search module 112. Then, the image search module 112 transmits the video signal received to the image processing module 114. The image processing module 114 processes the video signal received, and transmits the control data, the clock data and the image data extracted to the signal control and output module 115. The signal control and output module 115 first transmits the control data received to the corresponding control signal input terminal on the display panel 120, so as to set the display parameters of the display panel 120. After the display parameters are set, the image data received is transmitted to the corresponding image signal input terminal on the display panel 120, so that the display panel 120 continues to display the normal picture.

According to the embodiments of the present disclosure, the process of detecting, receiving, processing and setting the first video data is continuously performed without having to pause and wait for the execution of other operations, thereby eliminating the waste of waiting time in the parameter setting process.

Next, in step S320, the LOGO display module 113 is controlled to start transmitting the second video data for the LOGO display to the image processing module 114 (that is, the process of the LOGO display starts), after the display parameters of the display panel 120 are set by using the control data in the first video data (that is, after the signal control and output module 115 transmits the control data received to the corresponding control signal input terminal on the display panel 120).

Further, during the execution of step S310, there is no need to use the screen for display. Therefore, during the execution of step S310, the screen is not illuminated and is kept in the turn-off state, so that no flashing white screen occurs during the process of setting the display parameters by using the control data, and the user may not mistakenly think that the display device is abnormal.

According to the embodiments, after the execution of step S310 and before the execution of step S320, that is, after setting the display parameters of the display panel by using the control data in the first video data and before transmitting the second video data to the display panel for the LOGO display, a backlight signal is transmitted to the display panel to illuminate the screen of the display panel in order to prepare for display.

According to the embodiments of the present disclosure, since the setting of the display parameters has been completed before the LOGO display, there is no need to turn off the screen after the screen is turned on. Thus, the time interval T4 between two lightings of the screen may be eliminated, the boot process may be sped up and the boot time may be shortened.

Figure 4:
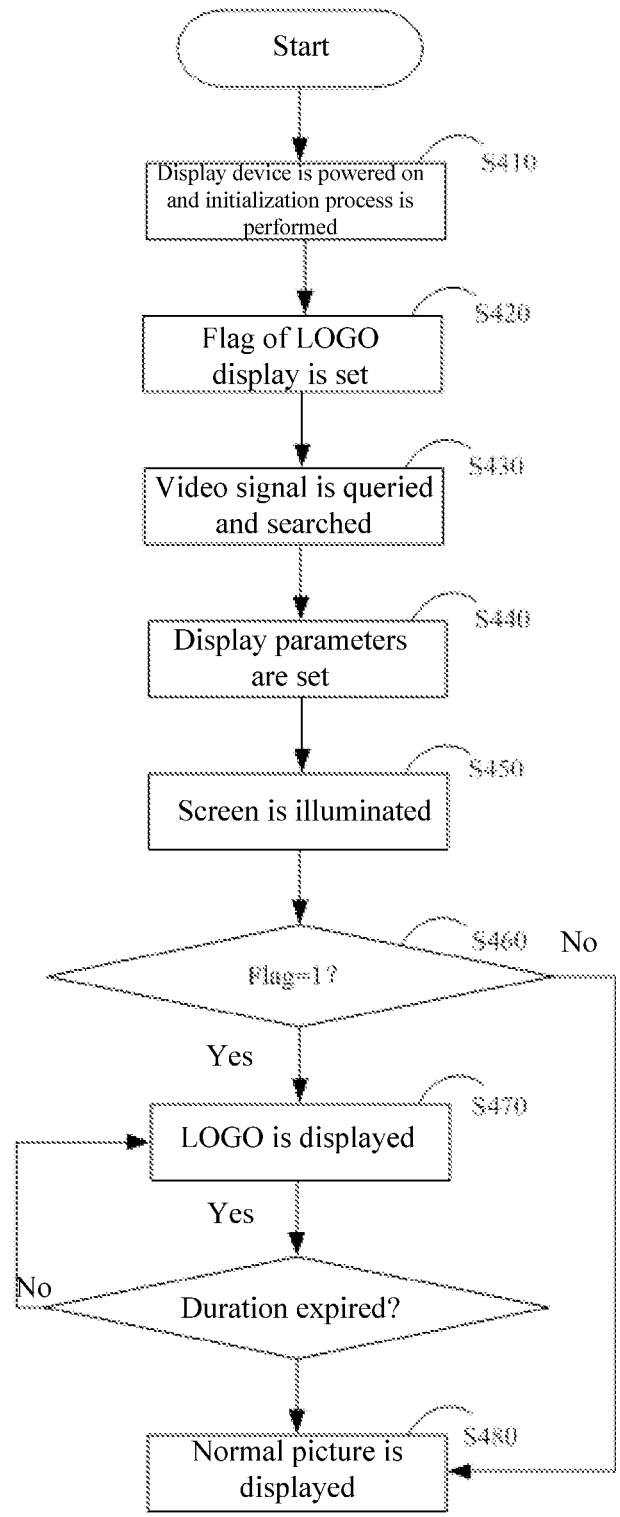
FIG. 4 schematically shows an example of a method of starting a picture display of a display device according to some embodiments of the present disclosure.

The method of starting the picture display of the display device may be implemented as shown in FIG. 4. FIG. 4 schematically shows an example of the method of starting the picture display of the display device according to some embodiments of the present disclosure. The process shown in FIG. 4 may be implemented by using program codes. As shown in FIG. 4, the process includes following steps.

In step S410, the display device is powered on and the initialization process is performed. The initialization process includes setting an initial operation state of each functional module on the display driver board and an initial operation state of the display array on the display panel.

In step S420, a flag (Flag) of the LOGO display is set. In step S420, the LOGO is not displayed, but only a flag bit of the LOGO display is set, and the screen of the display panel remains turned-off. For example, the flag bit of the LOGO display may be set to 1, which indicates that the LOGO picture is displayed in a subsequent process. The flag bit of the LOGO display may also be set to 0, which indicates that the LOGO picture is not displayed in the subsequent process, that is, the display of the LOGO picture is cancelled. According to the embodiments, a duration of the LOGO picture display may also be set accordingly.

In step S430, the video signal is queried and searched. Specifically, the interface module is controlled to detect the interface so as to detect whether the video signal is input at the interface. The video signal may be a video signal of a user image or a video signal of a video display provided by an external host or an external source. If it is detected that the video signal is input at the interface, the image search module is controlled to receive the video signal.

In step S440, the video signal is transmitted to the image processing module after being received, and the video processing module is controlled to process the video signal. According to the embodiments, the processing of the video signal may include extracting image data, clock data and control data from the video signal separately, scaling the image data, and the like. Then, the control data extracted is transmitted to the signal control and output module, and the signal control and output module is controlled to transmit the control data to the corresponding control signal input terminal of the display panel, so as to set the display parameters of the display panel.

In step S450, the screen is illuminated to prepare for the picture display.

In step S460, the flag bit Flag of the LOGO display is queried. If Flag is 1, it is determined that the display of the LOGO picture is performed, so that step S470 is performed. In this case, the set duration of the LOGO picture display is obtained, and the LOGO picture is displayed according to the set duration. If Flag is 0, the display of the LOGO picture is cancelled, and the process proceeds to step S480.

In step S470, the LOGO is displayed, and the process proceeds to step S480 after the set duration of the LOGO picture display is expired, so as to perform the display of the normal picture.

In step S480, the normal picture is displayed.

According to the example, the execution of LOGO display may be controlled by setting the flag bit of the LOGO display, which increases a flexibility of the LOGO display. The duration of the LOGO display may be preset as needed, so that the duration of the LOGO display may be adjusted according to the actual display needs, which further increases the flexibility of the LOGO display.

Figure 5A:
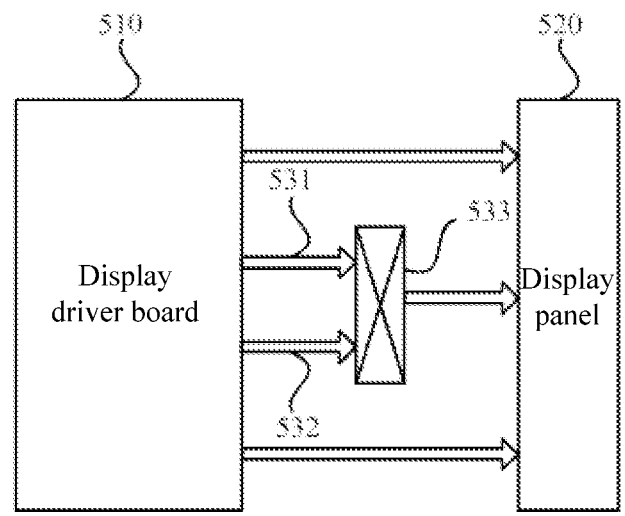
FIG. 5A schematically shows a transmission of data for displaying a normal picture and data for displaying a LOGO picture according to some embodiments of the present disclosure.

FIG. 5A schematically shows a transmission of the data for displaying the normal picture and the data for displaying the LOGO picture according to some embodiments of the present disclosure. As shown in FIG. 5A, according to the embodiments of the present disclosure, the image data for displaying the normal picture in the first video data and the second video data for displaying the LOGO are respectively transmitted to the display panel via different transmission channels. In FIG. 5A, the display driver board 510 transmits the image data in the first video data to the display panel 520 via a first channel 531, and transmits the second video data to the display panel 520 via a second channel 532.

Figure 5B:
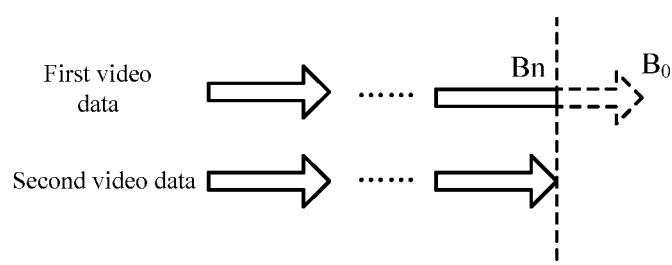
FIG. 5B schematically shows a process in which data for displaying a normal picture is masked by data for displaying a LOGO picture according to some embodiments of the present disclosure.

Further, as shown in FIG. 5A, the first channel 531 and the second channel 532 are respectively connected to a data masking device 533. In the case of only receiving the data signal from the first channel 531 or only receiving the data signal from the second channel 532, the data masking device 533 transmits the data signal from the first channel 531 or the data signal from the second channel 532 to the display panel 520 normally. In the case of simultaneously receiving the data signals from the first channel 531 and the second channel 532, the data masking device 533 only allows the data from the second channel 532 to pass normally, while masking the data from the first channel 531. That is, only the data in the second channel 532 is transmitted to the display panel 520. In this case, the data signal in the first channel 531 is discarded or is masked by the data in the second channel 532, as shown in FIG. 5B. The data masking device 533 may also be referred to as a data masker.

FIG. 5B schematically shows a process in which the data for displaying the normal picture is masked by the data for displaying the LOGO picture according to some embodiments of the present disclosure. In FIG. 5B, the first video data (specifically, the image data in the first video data) and the second video data are transmitted at the same time. At a vertical dotted line (where the data arrives at an input end of the display panel 520), the second video data is received, and some bits in the first video data, from a start bit B0 to a bit Bn arriving after a certain transmission time, are discarded or covered by the second video data.

When the display device is connected to some external signal sources, such as an external host device or a signal generator, the external host device or the signal generator may transmit a short black picture of RGB format prior to transmitting the normal picture. The display driver board usually uses a YUV format to parse this wrong picture, which causes a flashing green screen. Here, YUV is a color coding method different from RGB, Y represents brightness, and U and V represent chromaticity. In the embodiments of the present disclosure, when the data for displaying the normal picture and the data for displaying the LOGO picture are simultaneously transmitted to the display panel, a first part of the data for displaying the normal picture is covered by the data for displaying the LOGO picture, so that there is enough time to avoid the error picture transmitted by the external host device or the signal generator. Thus, the appearance of the flashing green screen may be avoided, which may further improve the user experience during the boot process.

According to some embodiments of the present disclosure, it is also possible to preset a specified number of bits, and then mask the specified number of bits of the image data in the first video data by using the second video data. After the specified number of bits have been masked, if the LOGO display has not been completed, that is, if the second video data is still being transmitted, the remaining image data is buffered. This may avoid covering valid image data.

According to the embodiments of the present disclosure, by optimizing the boot process of the display device, a seamless connection between the LOGO display and the normal picture display is realized, the boot time of the display device is shortened, and the user experience is improved.

According to the embodiments of the present disclosure, the seamless connection between the LOGO display and the normal picture display may be realized by modifying monitor software (Monitor) of the existing display device, and thus may be extended to the boot process of any liquid crystal display device. The boot process according to the embodiments of the present disclosure may be implemented based on the Monitor in either a high-end UHD model or an entry-level FHD model.

Figure 6:
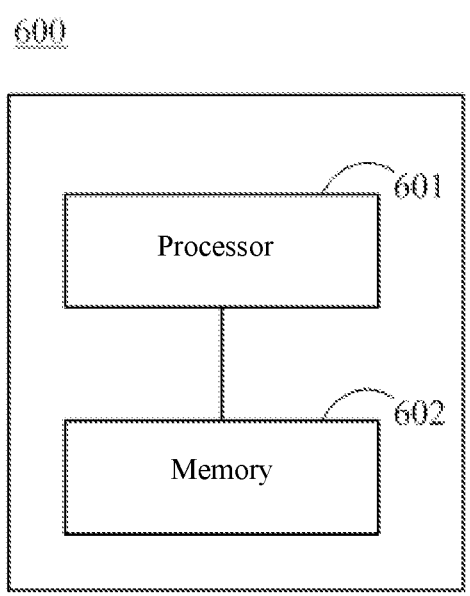
FIG. 6 schematically shows a block diagram of a video signal processing apparatus for a display device according to some embodiments of the present disclosure.

FIG. 6 schematically shows a block diagram of a video signal processing apparatus for a display device according to some embodiments of the present disclosure. As shown in FIG. 6, a video signal processing apparatus 600 includes a processor 601 and a memory 602. The memory 602 is configured to store machine-readable instructions, and the processor 601 may perform the method of starting the picture display of the display device according to any one of the embodiments described above.

In some embodiments, the processor 601 may perform following steps: receiving the first video data for the image display, in response to receiving the start signal; setting the display parameters of the display panel by using the control data in the first video data; and transmitting the second video data to the display panel for the LOGO display.

The memory 602 may have a form of a non-volatile or volatile memory, for example, an electrically erasable programmable read-only memory (EEPROM), a flash memory, and the like.

Those skilled in the art may understand that the method shown above is only exemplary. The method of the present disclosure is not limited to the steps and order shown above. The devices shown above may be other devices, and may include more modules. The various identifiers shown above are only exemplary and not restrictive. Those skilled in the art may make many changes and modifications based on the teaching of the illustrated embodiments.

It should be understood that the embodiments of the present disclosure described above may be implemented by software, hardware, or a combination thereof. For example, various components inside the device in the embodiments described above may be implemented by a variety of devices, including but not limited to: an analog circuit device, a digital circuit device, a digital signal processing (DSP) circuit, a programmable processor, an application specific integrated circuit (ASIC), a field programmable gate array (FPGA), a complex programmable logic device (CPLD), etc.

In addition, the embodiments of the present disclosure described herein may be implemented on a computer program product. More specifically, the computer program product is a product that has a computer-readable medium with computer program logic encoded thereon, and when executed on a computing device, the computer program logic provides related operations to implement the technical solutions of the present disclosure described above. When executed on at least one processor of a computing system, the computer program logic causes the at least one processor to perform the operations (methods) described in the embodiments of the present disclosure. Such settings of the present disclosure are typically provided as software, codes and/or other data structures provided or encoded on a computer-readable medium such as an optical medium (for example, a CD-ROM), a floppy disk or a hard disk, or such as firmware on one or more ROM or RAM or PROM chips or other medium of microcode, or a downloadable software image, a shared database, etc. in one or more modules. Software or firmware or such a configuration may be installed on the computing device, so that one or more processors in the computing device execute the technical solutions described in the embodiments of the present disclosure.

Although the present disclosure has been described above in conjunction with optional embodiments of the present disclosure, those skilled in the art shall understand that various modifications, substitutions and changes may be made to the present disclosure without departing from the spirit and scope of the present disclosure. Therefore, the present disclosure should not be limited by the embodiments described above, but should be defined by the appended claims and their equivalents.

What is claimed is:

1. A method of starting a picture display of a display device comprising a display panel, comprising:
   receiving a first video data for an image display, in response to receiving a start signal;
   setting display parameters of the display panel by using a control data in the first video data; and
   transmitting a second video data to the display panel for a LOGO display; and
   wherein the method further comprises: subsequent to setting the display parameters of the display panel by using the control data in the first video data, transmitting an image data in the first video data to the display panel for displays;
   wherein the image data in the first video data is transmitted to the display panel via a first channel, and the second video data is transmitted to the display panel via a second channel; and
   wherein the display panel only receives the second video data transmitted via the second channel, in a case where data are transmitted simultaneously via the first channel and the second channel.

2. The method of claim 1, wherein the display device further comprises a backlight source; and
   wherein the method further comprises: transmitting a backlight signal to the backlight source so as to control the backlight source to illuminate the display panel, after setting the display parameters of the display panel by using the control data in the first video data, and prior to transmitting the second video data to the display panel for the LOGO display.

3. The method of claim 1, wherein a specified number of bits of the image data in the first video data is masked by using the second video data, in a case where data are transmitted simultaneously via the first channel and the second channel.

4. The method of claim 3, wherein data following the specified number of bits of the image data is buffered, in a case where the specified number of bits of the image data in the first video data is masked by using the second video data and the LOGO display is not completed.

5. The method of claim 1, further comprising: setting a duration of the LOGO display in response to receiving the start signal.

6. A video signal processing apparatus for starting a picture display of a display device comprising a display panel, comprising:
   a memory having computer-readable instructions stored thereon; and
   at least one processor configured to execute the computer-readable instructions, so as to implement a method of starting a picture display of a display device, comprising:
   receiving a first video data for an image display, in response to receiving a start signal;
   setting display parameters of the display panel by using a control data in the first video data;
   transmitting a second video data to the display panel for a LOGO display; and
   subsequent to setting the display parameters of the display panel by using the control data in the first video data, transmitting an image data in the first video data to the display panel for display,
   wherein the image data in the first video data is transmitted to the display panel via a first channel, and the second video data is transmitted to the display panel via a second channel; and
   wherein the display panel only receives the second video data transmitted via the second channel, in a case where data are transmitted simultaneously via the first channel and the second channel.

7. A display device, comprising:
   a display panel; and
   a display driver board, wherein the video signal processing apparatus of claim 6 is provided on the display driver board.

8. The display device of claim 7, further comprising a data masker provided between the display driver board and the display panel, wherein the data masker is configured to mask a first video data transmitted via a first channel in a case where data are transmitted simultaneously via the first channel and a second channel.

9. The display device of claim 7, further comprising a backlight source provided in the display panel.

10. A non-transitory computer-readable storage medium having computer instructions stored thereon, wherein the computer instructions cause the computer implement a method of starting a picture display of a display device comprising a display panel, comprising:
    receiving a first video data for an image display, in response to receiving a start signal;
    setting display parameters of the display panel by using a control data in the first video data;
    transmitting a second video data to the display panel for a LOGO display; and
    subsequent to setting the display parameters of the display panel by using the control data in the first video data, transmitting an image data in the first video data to the display panel for display,
    wherein the image data in the first video data is transmitted to the display panel via a first channel, and the second video data is transmitted to the display panel via a second channel; and
    wherein the display panel only receives the second video data transmitted via the second channel, in a case where data are transmitted simultaneously via the first channel and the second channel.

* * * * *